United States Patent [19]

Cook

[11] Patent Number: 4,907,163
[45] Date of Patent: Mar. 6, 1990

[54] SYSTEM FOR CONTROLLING AN NC MACHINE FROM A PC TYPE COMPUTER

[75] Inventor: Greg Cook, Duncan, Okla.

[73] Assignee: Cook Manufacturing Corporation, Ducan, Okla.

[21] Appl. No.: 173,269

[22] Filed: Mar. 25, 1988

[51] Int. Cl.⁴ ............................................. G06F 1/00
[52] U.S. Cl. ............................ 364/474.15; 364/474.22
[58] Field of Search ..................... 364/474.22, 474.15, 364/148, 167–171, 475, 511; 318/561, 571, 568

[56] References Cited

U.S. PATENT DOCUMENTS

4,689,751  8/1987  Fujimoto ......................... 364/474.22
4,739,468  4/1988  Fujimoto ......................... 364/474.22
4,787,049 11/1988  Hirota ............................ 364/474.15

Primary Examiner—Michael R. Fleming
Attorney, Agent, or Firm—Johnson & Gibbs

[57] ABSTRACT

Disclosed is a system for controlling a numerically controlled machine tool sysem from a PC type computer system of the kind using an 8088 microprocessor chip and 8-bit words. The system includes an inverter timing board which is inserted into the PC equipment for conditioning signals from the parallel port of the computer into signals having wave forms of selected time length comforting to the numerical control tape code which is acceptable by the numerical control equipment at the machine tool.

37 Claims, 4 Drawing Sheets

FIG. 3
SIGNAL TIMING DIAGRAM

SYSTEM FOR CONTROLLING AN NC MACHINE FROM A PC TYPE COMPUTER

BACKGROUND OF THE INVENTION

Numerical control of machine tools is a well-developed art, and it developed at a time prior to the development of PC (personal computer) computer systems based on the 8088 microprocessor chip. Numerical control was developed by reference to special computer language or codes especially suitable to machine tool applications. One popular code is called ASCII, and an earlier but still used code is EIA. Both of these codes are based on 8-bit words and are parity controlled. The numerical control languages are not directly compatible to the signal output system characteristic of a PC type computer system. Such a system uses an 8-bit word controlled by a strobe signal.

At the time numerical control for computer systems was developed, the technology most feasible for storing and transmitting the part programs for use in a numerical control system was paper tape, that is, tape formed of relatively strong paper having holes punched in it in a pattern to stand for the numbers involved in the code. The tapes were either read right at the machine tool by a tape reader, or read at some remote location by such a reader, with the signals being transmitted to the numerical control unit of the machine tool by cable. In any event, the paper tapes were fragile and bulky, as well as being slow to read and process.

With the advent of PC types computer systems, based on the 8088 micro-processor chip, it has become desirable to take advantage of the computing power, speed and flexibility of a PC type system in control of machine tools. However, because of the vast number of numerically controlled machine tools in the field, and the huge library of tapes punched according to the popular NC codes, there is a large practical barrier to the usage of PC type computer systems in machine tool applications.

Accordingly, it is an object of the present invention to provide an inexpensive and effective system for making use of a PC type computer to control numerically controlled machine tools, and to make it possible to do away with, or at least retire into back-up libraries, the fragile and troublesome paper tapes hitherto employed for numerical control of machine tools. At the same time, however, it is possible to revert back to paper tape control of a given machine if that is desired in particular instances. Also, in accordance with the invention, it is possible to convert a paper tape library into a library of numerical controlled part instructions on the disk storage media characteristic of a PC type computer system.

An advantage of the invention is that it employs the inexpensive, efficient and effective PC type computer systems which are currently highly popular.

In accordance with the invention, a system for controlling a machine tool by the use of a PC type computer system is provided which includes switching means for selectively inserting an inverter timing board for conditioning signals into circuit position between a PC controlled system and the tape reader, or tape reader interface, of a numerically controlled (NC) or computer numerically controlled (CNC) unit of a machine tool.

Further in accordance with the invention, the inverter timing board is itself a system for controlling the machine tool which is adapted to be responsive to numerical control tape code signals from a computer of the PC type, which is adapted to store process and send signals in computer code.

The inverter timing board includes means for receiving parallel output bit signals from the parallel port of the computer system.

It further includes means for receiving a strobe signal from the parallel port of the same computer.

The inverter timing board includes time delay means actuatable by the strobe signal from the computer for conditioning the steady but strobable high and/or low bit signals from the parallel port of the computer into square wave signals having wave forms of selected time length conforming to the standards of the numerical control tape code being used, such as ASCII or EIA.

The inverter timing board also includes means for transmitting the conditioned square wave signals so produced to the machine tool, and in particular to the tape reader or tape reader interface of the NC control system of that machine tool.

Further in accordance with the invention, the transmitting means mentioned above preferably comprises an "and" gate for each bit signal, which gate generates an output signal upon input of a bit signal and also a signal from the time delay means.

Also in accordance with the invention, it is preferred that the transmitting means include inverter means for each conditioned square wave bit signal.

Further in accordance with the invention, the inverter means are preferably exclusive "or" gates having an input from the before-mentioned time delay means.

There is also provided, in accordance with the invention, an overall system for controlling a machine tool adapted to be responsive to numerical control tape code signals which includes a computer adapted to store, process and send signals in strobable computer code together with means for receiving parallel output bit signals from the parallel port of a computer and means for receiving a strobe signal from the parallel port of said computer. There are also time delay means actuatable by said strobe signal for conditioning the steady but strobable high and/or low bit signals from the parallel port of said computer into square wave signals having wave forms of selected time length conforming to said numerical control tape code and means for transmitting said conditioned square wave signals. Further, the system includes numerical control equipment for receiving, processing and applying said conditioned square wave signals to thereby direct movements of said machine tool.

This system preferably also includes means for transmitting signals derived directly from a paper tape to said numerical control equipment and means for selectively connecting one or the other of said conditioned wave transmitting means and said paper tape signal transmitting means to said numerical control equipment.

BRIEF DESCRIPTION OF THE DRAWINGS

The manner in which the foregoing objects and purposes are accomplished together with other objects, purposes and functions of the invention may best be understood by considering the detailed description which follows, together with the accompanying drawings in which.

DETAILED DESCRIPTION OF THE DRAWINGS

Figure 1:
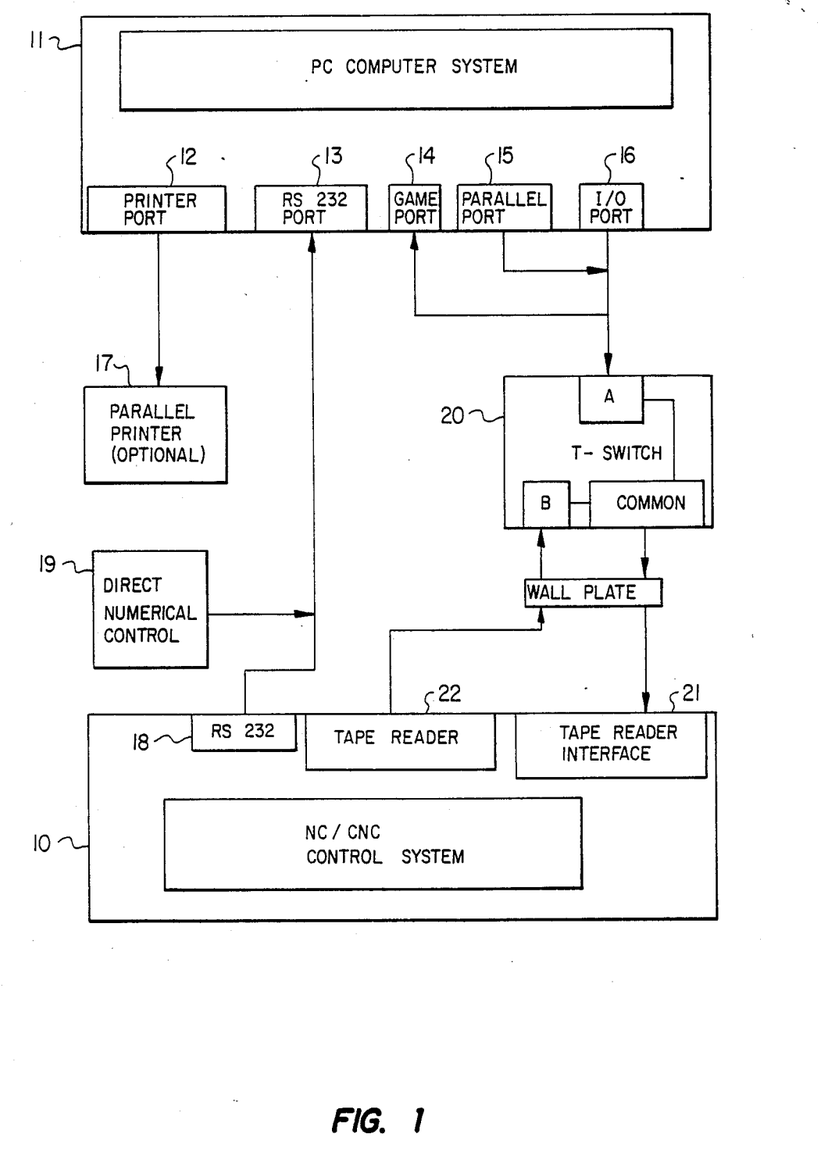
FIG. 1 is a block diagram of a system constructed and arranged in accordance with the invention.

Attention is first directed to FIG. 1 which shows in block diagram form the overall system of the invention. Block 10 represents a numerically controlled or computer numerically controlled system associated with a machine tool which it controls, such as a lathe, drill or milling machine. Block 11 illustrates a PC type computer system of the kind employing an 8088 microprocessor. The control system 10 is adapted to respond to and operate on code signals presented to it in ASCII language or EIA language. The PC computer system, when unmodified, is adapted to generate signals according to a PC code format. The PC code format is an 8-bit strobable signal. The ASCII or EIA code format is an 8-bit time sequence signal. Unmodified, the PC output signals are incompatible with the NC/CNC control system signals.

The PC computer system 11 has several ports including a printer port 12, a communications or RS232 port 13, a game port 14, a parallel port 15, and an IO port 16. The printer port may be connected to a parallel printer 17, which in accordance with the invention, is optional.

The RS232 port 13 is connected to an RS232 connection at the NC control system designated 18. In addition, direct numerical control equipment 19 may be connected through the RS232 connection 18 of the NC control system so that direct numerical control of the kind priorly used may be employed if desired. The game port 14, parallel port 15 and IO port 16 of the PC computer system 11 are connected through a T-switch 20 to the tape reader interface 21 of NC system 10. In addition, a tape reader 22 associated with the NC control system 10 may be looped through the T-switch through plug B so that a tape may be read directly at the tape reader 22 and fed through the interface 21 to the NC control system, as is done in prior techniques. Thus, by means of T-switch 20, a capability is maintained for using paper tapes to control the NC control system as was done in the past, notwithstanding the presence of the PC system utilized in the present invention.

Game port 14 is used in accordance with the invention to transmit signals such as "forward", "reverse", etc. to the timer inverter board which is located at IO port 16. Furthermore, parallel port 15 is used to transmit signals from the PC computer system memory equipment, these signals relating to the actual instructions for operating the machine tool when they are properly translated to NC code. When the PC computer system is used to control the NC control system, signals from ports 14, 15 and 16 move through T-switch 20 to the tape reader interface 21. In this way, the set of signals from the PC computer system replace the set of signals that would come from the tape reader 22 in accordance with prior art practice.

Figure 2:
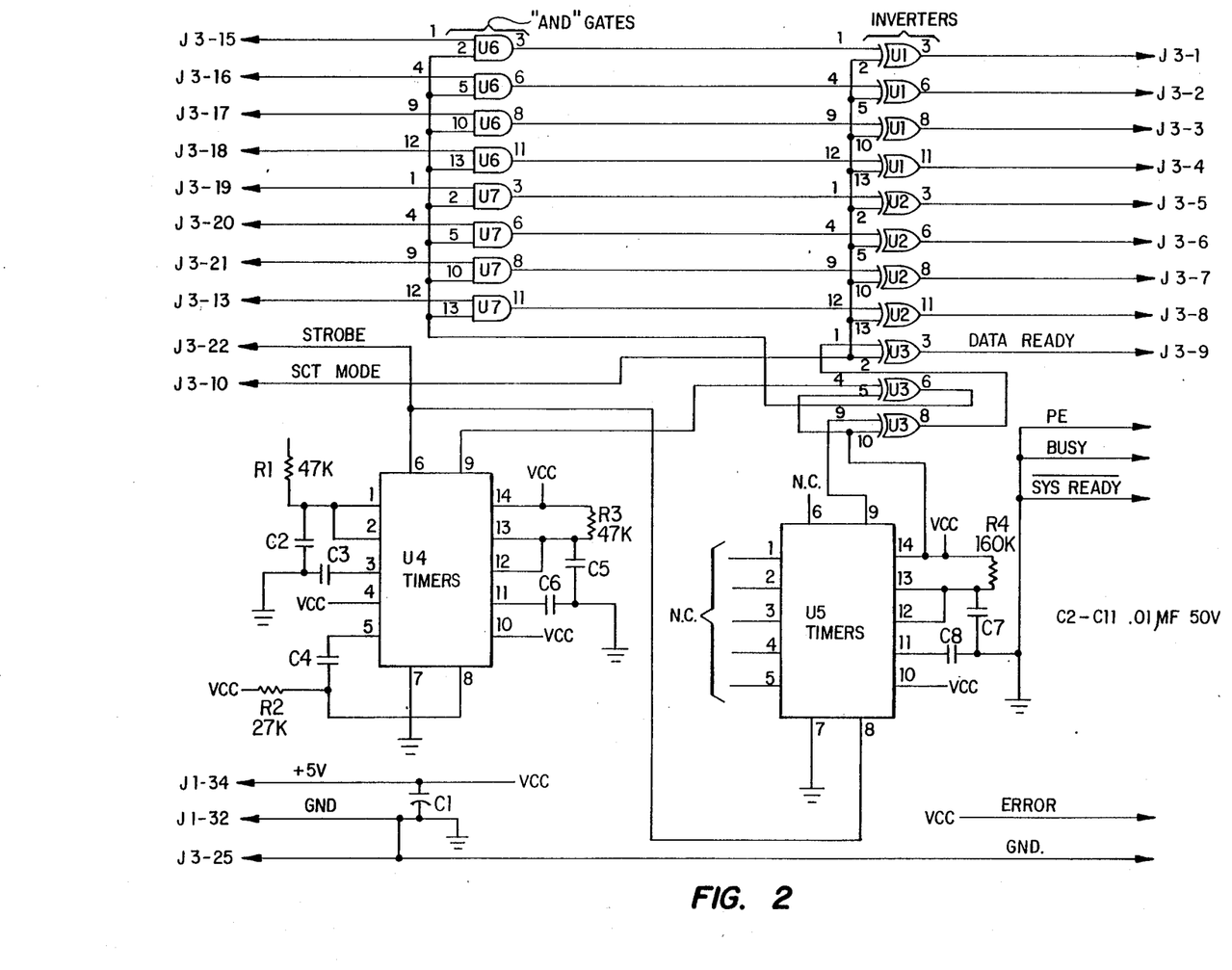
FIG. 2 is a schematic diagram of the inverter timing board portion of the equipment of the invention.

Attention is now directed to FIG. 2. As can be seen from the circuit diagram of FIG. 2, the inverter timer board includes a series of "and" gates U-6 and U-7 and a series of inverters which are exclusive "or" gates U-1 and U-2. It also includes two dual timers U-4 and U-5 which are rigged up to work sequentially. Strobe signals input at J3-22 start the timers and the outputs of the timers are processed through inverters in U-3 to provide actuating signals for the "and" gate (from pin-6 of U-3). The other output of U-3 (pin-8) is an input to another portion of U-3 (pin-1), to produce a data-ready signal (pin-3) which is output at J3-9.

The dual timers U-4 and U-5 are, in the preferred embodiment, type LM556 as produced by National Semiconductor, and are discussed in greater detail herein below. In the foregoing description of the inverter timer card, it can be seen that it is a system for controlling a machine tool which is adapted to be responsive to numerical tape code signals from a computer which is adapted to store, process and send signals in computer code. The signals are input at JS-13 and J3-15 through J3-21. They come from the parallel port of the computer 10 and ultimately from its memory. The card also includes means for receiving a strobe signal from the parallel port of the computer, this signal being input at J3-22. The timers U-4 and U-5 are time delay means actuatable by the strobe signal for conditioning the steady by strobable high or low bit signals into square wave signals having wave forms of selected time length conforming to the numerical control code. The outputs at J3-1 through J3-8 are transmitted in condition form to the machine tool by way of T-switch 20 and tape reader interface 21. The transmitting means also include the "and" gates U-6 and U-7 and the inverter means U-1 and U-2 which, as mentioned before, are exclusive "or" gates.

Figure 3:
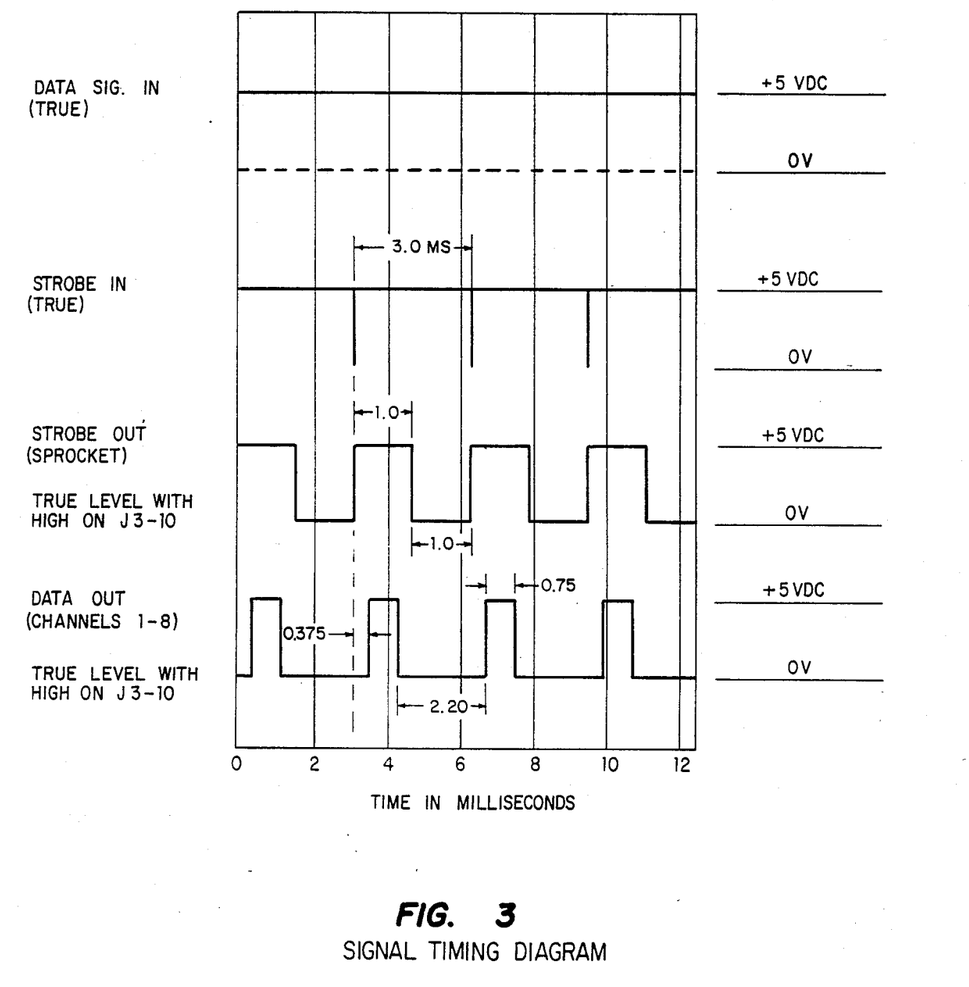
FIG. 3 is a signal timing diagram illustrating the manner in which signals are conditioned by the equipment of the invention.

Attention is now directed to the signal timing diagram of FIG. 3. The "data signals in" are binary signals with a value either of plus 5 volts or zero volts. The "strobe signal in" is a sharp spike signal going low for a very short time from a nominal plus 5 volts. The "strobe signal out", or sprocket signal, is a square wave signal varying step-wise between plus 5 volts and zero volts DC, and the data out on channels 1 through 8 is also a square wave signal conforming to one of the NC codes and being spaced in time a selected distance from the strobe signal out by reason of the action of the timers as explained above. Also, it can be seen that the 8-bit strobable input signals from the PC 10 are converted into signals having a wave form with time lengths readable as NC 8-bit code.

Figure 4:
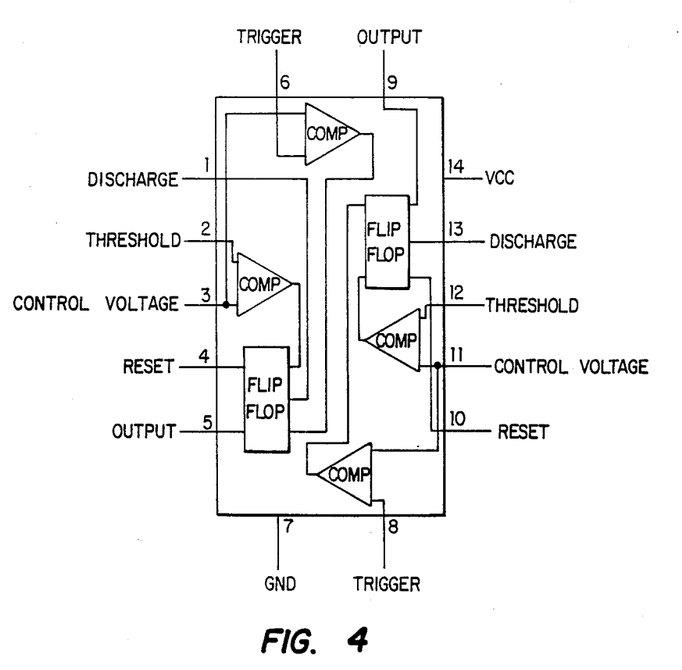
FIG. 4 is a block diagram of a timer device employed in accordance with the invention.
Figure 5:
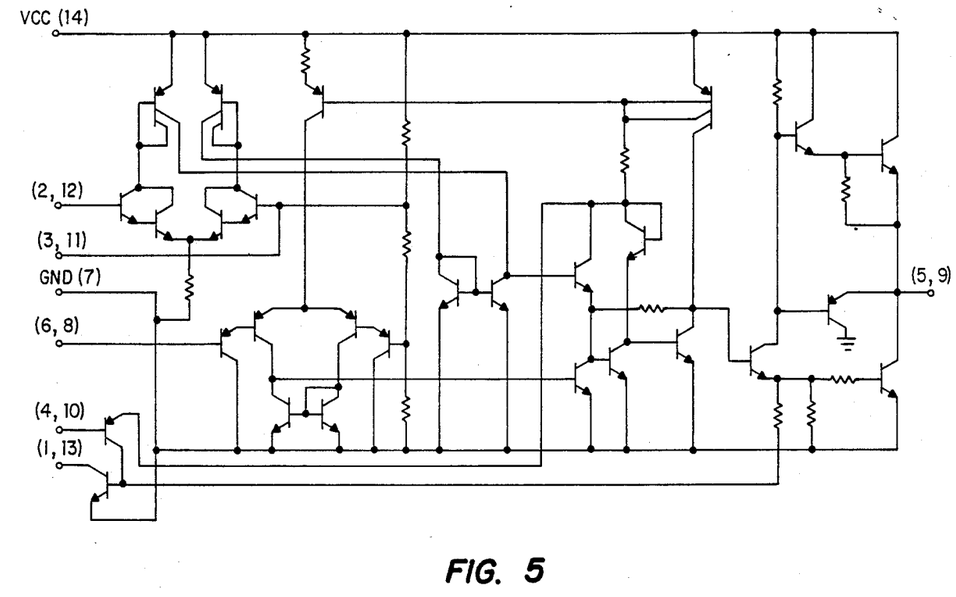
FIG. 5 is a circuit diagram of said timer device.

Attention is now directed to FIG. 4 and FIG. 5 which are respectively a block diagram of an LM556 dual timer, as utilized in the preferred embodiment of the invention, and a schematic diagram of one-half of such timer. These figures are based on the data sheet for National Semiconductors LM556 dual timer, which data sheet is incorporated by reference herein. As can be seen from these figures, the dual timer consists of two internal timers, each of which is a pair of comparators connected to a flip-flop circuit. By appropriately picking the values of external capacitances and resistances (such as R-1, R-3, C-2, C-3, C-5, C-6) as shown in FIG. 2, the time delay introduced by the dual timers can be changed. In this way, time lengths for the tape code signals can be made to conform to the requirements of ASCII or EIA code.

In operation, the apparatus and systems of the present invention can essentially replace the NC or CNC control system and, in particular, the clumsy and fragile paper tape program portions thereof, by a PC computer of the kind based on the 8088 micro-processor (or a micro-processor of a later generation operating in general accordance with the PC system), with the memory being handled not on paper tapes, but on the disks and internal memory associated with the PC computer system. At the same time, in accordance with the invention, the capability is maintained to utilize the older technology when that is desired. In this manner, a very powerful and very flexible machine tool control system is provided at the very modest type of cost associated with PC computer systems.

What is claimed is:

1. A system for sending control signals to a machine tool which is adapted to be responsive to signals conforming to numerical control tape code, said system utilizing signals output from a computer having a parallel port, said computer being adapted to store, process and send steady but strobable high and/or low bit signals in computer code comprising:
   (a) means for receiving parallel output bit signals from the parallel port of said computer;
   (b) means for receiving a strobe signal from the parallel port of said computer;
   (c) time delay means actuatable by said strobe signal for conditioning the steady by strobable high and/or low bit signals from the parallel port of said computer into conditioned square wave signals having wave forms of selected time length conforming to said numerical control tape code; and
   (d) means for transmitting said conditioned square wave signals to said machine tool.

2. A system in accordance with claim 1 in which said transmitting means comprises an "and" gate for each bit signal generating an output signal upon input of a bit signal and a signal from said time delay means.

3. A system in accordance with claim 1 in which said transmitting means includes inverter means for each conditioned square wave bit signal.

4. A system in accordance with claim 3 in which said inverter means are exclusive "or" gates having an input from said time delay means.

5. A system for controlling a machine tool adapted to be responsive to signals conforming to numerical control tape code comprising:
   (a) a computer adapted to store, process and send steady but strobable high and/or low bit signals in computer code, said computer having a parallel port;
   (b) means for receiving parallel output bit signals from said parallel port of said computer;
   (c) means for receiving a strobe signal from the parallel port of said computer;
   (d) time delay means actuatable by said strobe signal for conditioning the steady but strobable high and/or low bit signals from the parallel port of said computer into conditioned square wave signals having wave forms of selected time length conforming to said numerical control tape code;
   (e) means for transmitting said conditioned square wave signals; and
   (f) numerical control equipment adapted to receive, process and apply said conditioned square wave signals to thereby direct movements of said machine tool.

6. A system in accordance with claim 5 in which said strobable computer code utilizes an 8-bit word.

7. A system in accordance with claim 6 in which said computer is based on an 8088 microprocessor.

8. A system in accordance with claim 5 in which said transmitting means comprises an "and" gate for each bit signal generating an output signal upon input of a bit signal and a signal from said time delay means.

9. A system in accordance with claim 5 in which said transmitting means includes inverter means for each conditioned square wave bit signal.

10. A system in accordance with claim 9 in which said inverter means are exclusive "or" gates having an input from said time delay means.

11. A system in accordance with claim 5 and further comprising means for transmitting signals derived directly from a paper tape to said numerical control equipment and means for selectively connecting one or the other of said conditioned wave transmitting means and said paper tape signal transmitting means to said numerical control equipment.

12. A system in accordance with claim 5 wherein said numerical control equipment further comprises:
   means for reading tapes having numerical control tape code signals encoded thereon;
   means for transmitting numerical control tape code signals read by said tape reading means; and
   interface means adapted to received; process and apply said conditioned square wave signals or to receive, process and apply said numerical control tape code signals to direct movements of said machine tool.

13. A system in accordance with claim 12 further comprising switching means for receiving said numerical control tape code signals transmitted by said tape reading means, receiving said conditioned square wave signals from said means for transmitting said conditioned square wave signals and selectively transmitting either said numerical control tape code signals or said conditioned square wave signals to said interface means.

14. A system for sending control signals to a machine tool which is adapted to be responsive to signals conforming to numerical control tape code, said system utilizing signals output from a computer having a parallel port, said computer being adapted to store, process and send signals in computer code, comprising:
   (a) means for receiving parallel output bit signals from the parallel port of said computer;
   (b) means for receiving a computer code signal from the parallel port of said computer;
   (c) time delay means actuatable by said computer code signal for conditioning the parallel output bit signals from the parallel port of said computer into conditioned square wave signals having wave forms of selected time length conforming to said numerical control tape code; and
   (d) means for transmitting said conditioned square wave signals to said machine tool.

15. A system in accordance with claim 14 in which said transmitting means comprises an "and" gate for each bit signal generating an output signal upon input of a bit signal and a signal from said time delay means.

16. A system in accordance with claim 14 in which said transmitting means includes inverter means for each conditioned square wave bit signal.

17. A system in accordance with claim 16 in which said inverter means are exclusive "or" gates having an input from said time delay means.

18. A system for controlling a machine tool adapted to be responsive to signals conforming to numerical control tape code comprising:

(a) a computer adapted to store, process and send signals in computer code, said computer having a parallel port;
(b) means for receiving parallel output bit signals from said parallel port of said computer;
(c) means for receiving a computer code signal from the parallel port of said computer;
(d) time delay means actuatable by said computer code signal for conditioning the signals from the parallel port of said computer into conditioned square wave signals having wave forms of selected time length conforming to said numerical control tape code;
(e) means for transmitting said conditioned square wave signals; and
(f) numerical control equipment adapted to receive, process and apply said conditioned square wave signals to thereby direct movements of said machine tool.

19. A system in accordance with claim 18 wherein said numerical control equipment further comprises:
means for reading tapes having numerical control tape code signals encoded thereon;
means for transmitting numerical control tape code signals read by said tape reading means; and
interface means adapted to receive, process and apply said conditioned square wave signals or to receive, process and apply said numerical control tape code signals to direct movements of said machine tool.

20. A system in accordance with claim 19 further comprising switching means for receiving said numerical control tape code signals transmitted by said tape reading means, receiving said conditioned square wave signals from said means for transmitting said conditioned square wave signals and selectively transmitting either said numerical control tape code signals or said conditioned square wave signals to said interface means.

21. A system in accordance with claim 18 in which said computer code signal utilizes an 8-bit word.

22. A system in accordance with claim 21 in which said computer is based on an 8088 microprocessor.

23. A system in accordance with claim 18 in which said transmitting means comprises an "and" gate for each bit signal generating an output signal upon input of a bit signal and a signal from said time delay means.

24. A system in accordance with claim 18 in which said transmitting means includes inverter means for each conditioned square wave bit signal.

25. A system in accordance with claim 24 in which said inverter means are exclusive "or" gates having an input from said time delay means.

26. A system in accordance with claim 18 and further comprising means for transmitting signals derived directly from a paper tape to said numerical control equipment and means for selectively connecting one or the other of said conditioned wave transmitting means and said paper tape signal transmitting means to said numerical control equipment.

27. A system for controlling a machine tool adapted to be responsive to signals conforming to numerical control tape code comprising:
(a) a computer adapted to store, process and send signals in computer code;
(b) means for receiving output signals from said computer;
(c) time delay means actuatable by said computer for conditioning the output signals of said computer into conditioned signals having wave forms conforming to said numerical control tape code;
(d) means for transmitting said conditioned signals; and
(e) numerical control equipment adapted to receive, process and apply said conditioned signals to thereby direct movements of said machine tool.

28. A system in accordance with claim 27 wherein said numerical control equipment further comprises:
means for reading tapes having numerical control tape code signals encoded thereon;
means for transmitting numerical control tape code signals read by said tape reading means; and
interface means adapted to receive, process and apply said conditioned square wave signals or to receive, process and apply said numerical control tape code signals to direct movements of said machine tool.

29. A system in accordance with claim 27 further comprising switching means for receiving said numerical control tape code signals transmitted by said tape reading means, receiving said conditioned square wave signals from said means for transmitting said conditioned square wave signals and selectively transmitting either said numerical control tape code signals or said conditioned square wave signals to said interface means.

30. A system in accordance with claim 27 further comprising means for producing a strobe signal, said time delay means actuated by said strobe signal.

31. A system in accordance with claim 27 wherein said time delay means conditions said output signals into conditioned square wave signals having wave forms of selected time length conforming to said numerical control tape code.

32. A system in accordance with claim 31 further comprising means for producing a strobe signal, said time delay means actuated by said strobe signal.

33. A system in accordance with claim 27 in which said computer further includes a parallel port.

34. A system in accordance with claim 33 wherein said means for receiving output signals from said computer further comprises means for receiving parallel output bit signals from said parallel port of said computer.

35. A system in accordance with claim 34 further comprising means for receiving a strobe signal from the parallel port of said computer.

36. A system in accordance with claim 35 wherein said time delay means are actuated by said strobe signal.

37. A system in accordance with claim 36 wherein said time delay means conditions said output signals into conditioned square wave signals having wave forms of selected time length conforming to said numerical control tape code.

* * * * *

UNITED STATES PATENT AND TRADEMARK OFFICE
CERTIFICATE OF CORRECTION

PATENT NO. : 4,907,163  
DATED : March 6, 1990  
INVENTOR(S) : Greg Cook

Page 1 of 2

It is certified that error appears in the above-identified patent and that said Letters Patent is hereby corrected as shown below:

| | |
|---|---|
| In the Abstract, line 2 | delete "sysem" <br> insert —system— |
| In the Abstract, line 8 | delete "comforting" <br> insert —conforming— |
| Column 1, line 31 | delete "types" <br> insert —type— |
| Column 1, line 67 | delete "responsible" <br> insert —responsive— |
| Column 4, line 24 | delete "by" <br> insert —but— |
| Column 4, line 28 | delete "condition" <br> insert —conditioned— |
| Column 5, line 24 | delete "by" <br> insert —but— |

UNITED STATES PATENT AND TRADEMARK OFFICE
CERTIFICATE OF CORRECTION

PATENT NO. : 4,907,163

DATED : March 6, 1990

INVENTOR(S) :

It is certified that error appears in the above-identified patent and that said Letters Patent is hereby corrected as shown below:

Column 6, line 24          delete "received"
                                        insert --receive--

Signed and Sealed this

Eleventh Day of June, 1991

*Attest:*

HARRY F. MANBECK, JR.

*Attesting Officer*        *Commissioner of Patents and Trademarks*